UNITED STATES PATENT OFFICE.

JOHN STEWART MACARTHUR, OF GLASGOW, SCOTLAND.

PROCESS OF MAKING WHITE LEAD.

SPECIFICATION forming part of Letters Patent No. 548,566, dated October 22, 1895.

Application filed July 31, 1894. Serial No. 519,086. (No specimens.) Patented in England May 17, 1894, No. 9,655.

*To all whom it may concern:*

Be it known that I, JOHN STEWART MACARTHUR, a subject of the Queen of Great Britain and Ireland, residing at Glasgow, Scotland, have invented certain Improvements in the Making of White Lead, (for which I have obtained British Patent No. 9,655, dated May 17, 1894,) of which the following is a specification.

The object of my invention is the making of white lead in an improved and very economical manner; and in carrying out my invention I first prepare a solution of a tartrate of soda or of potash or of a mixture of these alkalies or of the double tartrate known as "Rochelle salt." The solution, which should be neutral or slightly alkaline, (such alkalinity being by preference produced by the addition of caustic soda or caustic potash,) may contain from ten to twenty parts of tartrate to every one thousand parts of water, fourteen parts of tartrate yielding very good results. To the solution heated to about its boiling-point I add an oxide of lead, by preference massicot or litharge. The other oxides of lead as ordinarily met with in commerce are to a certain extent soluble in the solutions specified, and to the extent to which they are soluble can be used for the purposes specified, but most advantageous forms and compositions of oxide to use, and those which I prefer to use are massicot or litharge. I agitate the mixture to prevent settling of the oxide and to facilitate the intended reaction; or I cause the solution to percolate through a layer of the lead oxide of moderate depth, say a depth of about two inches. When the oxide of lead, or most of it, has become dissolved, undissolved residues are separated by filtration or otherwise and carbonic acid is passed through the solution, which is maintained at the temperature hereinbefore indicated. The carbonic acid may be derived from any convenient source, such as fire-gases, but should be free from dust or other solid impurities and from other gas which is not inert. The water employed is preferably as free from color as is conveniently possible.

The lead in solution is gradually precipitated as carbonate or white lead, which may be used as ordinary white lead after separation of the liquid and purification and drying by known means. The solution and washings separated from the white lead may be used again indefinitely after concentration by evaporation if necessary.

Instead of passing carbonic acid through the solution, it will be sufficient when speed is not an object for it to be present in the atmosphere in contact with the surface of the solution, and as the lead oxide becomes gradually converted into white lead more lead oxide may be added from time to time.

The reactions which takes place are illustrated in the following example:

*First Stage.*

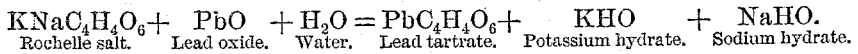

$$\underset{\text{Rochelle salt.}}{KNaC_4H_4O_6} + \underset{\text{Lead oxide.}}{PbO} + \underset{\text{Water.}}{H_2O} = \underset{\text{Lead tartrate.}}{PbC_4H_4O_6} + \underset{\text{Potassium hydrate.}}{KHO} + \underset{\text{Sodium hydrate.}}{NaHO}.$$

*Second Stage.*

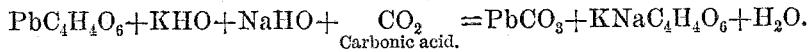

$$PbC_4H_4O_6 + KHO + NaHO + \underset{\text{Carbonic acid.}}{CO_2} = PbCO_3 + KNaC_4H_4O_6 + H_2O.$$

Tartrates differ very materially from other solvents of lead oxide, inasmuch as they do not suffer loss by volatilization, as happens with acetate of ammonia. They give up their lead completely when treated with carbonic acid, as described, and are then completely regenerated, whereas nitrates and acetates do not give up all their lead and are only partially regenerated on treatment with carbonic acid. Alkali hydrates (caustic alkalies) do give up their lead completely on treatment with carbonic acid, but are completely altered in the process, being converted into carbonates.

Tartrates dissolve approximately their full chemical equivalent of lead oxide, whereas alkali hydrates and many other solvents are very imperfect in this respect.

I claim as my invention—

The process for making white lead, in which lead oxide is dissolved in a solution of a tartrate of soda or of potash or of a mixture of these alkalies or of the double tartrate known as "Rochelle salt" at or about a boiling temperature, and is subsequently treated with carbonic acid, during which treatment the liquid is maintained at about a boiling temperature, substantially as hereinbefore described.

In testimony whereof I have signed my name to this specification in the presence of two subscribing witnesses.

JOHN STEWART MACARTHUR.

Witnesses:
EDMUND HUNT,
GEORGE PATTERSON.